United States Patent [19]

Lai et al.

[11] Patent Number: 4,988,487

[45] Date of Patent: Jan. 29, 1991

[54] PROCESS FOR RECOVERING METAL VALUES SUCH AS SCANDIUM, IRON AND MANGANESE FROM AN INDUSTRIAL WASTE SLUDGE

[75] Inventors: Wen-Chao Lai, Westboro; William J. Rourke, Worcester; Samuel Natansohn, Sharon, all of Mass.

[73] Assignee: GTE Laboratories Incorporated, Waltham, Mass.

[21] Appl. No.: 426,624

[22] Filed: Oct. 24, 1989

[51] Int. Cl.$^5$ .................. C01F 17/00; C22B 3/00; C22B 47/00; C22B 61/00
[52] U.S. Cl. .................. 423/21.5; 423/21.1; 423/50; 423/55; 423/140; 423/263; 423/DIG. 14; 75/743
[58] Field of Search .................. 423/21.1, 263, 50, 55, 423/140, DIG. 14, 21.5; 75/743

[56] References Cited

U.S. PATENT DOCUMENTS

| | | | |
|---|---|---|---|
| 2,997,368 | 8/1961 | Barent et al. | 423/50 |
| 3,549,321 | 12/1970 | Everett | 423/140 |
| 3,970,738 | 7/1976 | Matsui et al. | 423/140 |
| 4,353,878 | 10/1982 | Quatrini et al. | 423/55 |
| 4,624,703 | 11/1986 | Vanderpool et al. | 75/101 R |
| 4,626,280 | 12/1986 | Vanderpool et al. | 75/101 R |
| 4,718,995 | 1/1988 | Vanderpool et al. | 204/112 |
| 4,718,996 | 1/1988 | Vanderpool et al. | 204/112 |
| 4,751,061 | 6/1988 | Kim et al. | 423/21.5 |
| 4,765,909 | 8/1988 | Rourke et al. | 210/672 |
| 4,808,384 | 2/1989 | Vanderpool et al. | 423/21.1 |
| 4,816,233 | 3/1989 | Rourke et al. | 423/21.5 |

OTHER PUBLICATIONS

Sigma Chemical Company, 1987 Catalog, p. 769.

*Primary Examiner*—Gary P. Straub
*Assistant Examiner*—Steven Bos
*Attorney, Agent, or Firm*—Carl F. Ruoff; Donald R. Castle

[57] ABSTRACT

A process for eliminating an industrial waste sludge by converting its metal values into useful products involves the selective leaching of Mn, divalent Fe, and other valuable metals, such as Sc, Co, Cr, Ni, Th, rare earths, etc. with a mixture of dilute sulfuric acid and a reductant at ambient temperature. Scandium is recovered by passing the leachate through an ion exchange column which is packed with a weakly cationic resin. The retention of other metals on the resin column is negligible. The scandium is eluted from the resin column and converted to a solid product. The raffinate from the ion exchange column is titrated with an alkali solution to convert the metals, except divalent Mn and Fe, to a solid metal hydroxide. After the separation the filtrate is treated with an alkali and an oxidant to recover iron as a solid product of iron oxide which is separated from the solution. The remaining solution contains only Mn values which are recovered by treating the solution with an alkali and an oxidant to yield a solid manganese product. Separation of the solid leaves a liquid that can be discharged directly. The residue from the initial acid leaching contains the remaining metal values. HCl is used to selectively dissolve the Fe values. The insoluble residue is digested in an alkali to extract the total tungsten values. The residue from the alkali digestion contains substantial amounts of Ta, Nb and Ti and is a viable source for these metals.

8 Claims, No Drawings

PROCESS FOR RECOVERING METAL VALUES SUCH AS SCANDIUM, IRON AND MANGANESE FROM AN INDUSTRIAL WASTE SLUDGE

FIELD OF INVENTION

This invention relates to the treatment of an industrial waste material. More particularly, it relates to a process whereby the metal values are recovered from the waste material thus enabling safe disposal.

BACKGROUND

In the obtaining metals from their ores, such as the processing of tungsten bearing ores to obtain the tungsten values therefrom, a quantity of a waste sludge is generated. This waste material contains low levels of various metals.

U.S. Pat. No. 4,624,703 issued Nov. 25, 1986 and assigned to GTE Products Corporation, discloses a process for recovering tungsten, scandium, iron and manganese from a tungsten bearing material via a solvent extraction process using a dialkyl phosphoric acid to extract the scandium. U.S. Pat. No. 4,624,703 is incorporated by reference herein.

U.S. Pat. No. 4,626,280 issued Dec. 2, 1986 and assigned to GTE Products Corporation discloses another process for recovering tungsten, scandium, iron and manganese from a tungsten bearing material via a process in which the material is digested in an aqueous sulfur dioxide solution and a tertiary alkyl primary amine is used as an extracting agent for the scandium. U.S. Pat. No. 4,626,280 is incorporated by reference herein.

U.S. Pat. No. 4,718,995 issued Jan. 12, 1988 and is assigned to GTE Products Corporation is a continuation-in-part of the aforementioned U.S. Pat. No. 4,626,280 and discloses using sulfuric acid and a reducing agent to digest the tungsten bearing material. U.S. Pat. No. 4,718,995 is incorporated by reference herein.

U.S. Pat. No. 4,718,996 issued Jan. 12, 1988 assigned to GTE Products Corporation is a continuation-in-part of U.S. Pat. No. 4,624,703, mentioned above. U.S. Pat. No. 4,718,996 discloses the additional aspect of using a sulfur dioxide aqueous solution to digest the tungsten bearing material. U.S. Pat. No. 4,718,996 is incorporated by reference herein.

U.S. Pat. No. 4,808,384 issued Feb. 28, 1989 assigned to GTE Products Corporation relates to the process disclosed in U.S. Pat. No. 4,624,703 mentioned above. U.S. Pat. No. 4,808,384 discloses the additional aspect of using coal as a reducing agent in the digestion step and is incorporated by reference herein.

An additional process that will recover essentially all of the valuable metal values from the waste material without the generation of hazardous or toxic materials is an advancement in the art.

SUMMARY OF THE INVENTION

In accordance with one aspect of this invention, there is provided a process comprising (a) contacting a solid waste material containing metal values that comprise at least some tungsten, iron, scandium and manganese and at least one other metal value which metal is selected from the group consisting of Group III metals, cobalt, nickel and rare earth metals and, optionally, other refractory metals, silicon and other additional metal values with an acid solution containing a reducing agent for conversion of tetravalent manganese to divalent manganese for a sufficient time at a sufficient temperature to form a first aqueous acidic leachate containing the major portion of the scandium, manganese and divalent iron and the additional metal values, if present, and a first solid residue containing the tungsten, the remaining iron and, if present, said other refractory metals, (b) separating the first aqueous acidic leachate and the first solid residue, (c) leaching said first solid residue with sufficient hydrochloric acid for a sufficient time to form a second aqueous acidic leachate containing essentially all of the remaining iron as ferric chloride and a second solid residue containing the tungsten and, if present, the other refractory metals, (d) digesting the second solid residue with an alkali metal base for a sufficient time and at a sufficient temperature to form a first digested solution containing the tungsten and a second solid residue, containing, if present, the other refractory metals, (e) contacting the first acidic leachate with an iminodiacetic acid cationic ion exchange resin to retain a major portion of said scandium on the resin and forming an aqueous raffinate containing the manganese and divalent iron, the other metal value and, if present, the additional metal values, (f) eluting essentially all of the scandium from the resin by an aqueous solution of a chelating agent to form an aqueous elution solution containing the scandium, (g) adding a precipitating agent to the elution solution to form a solid scandium compound phase and a first aqueous solution phase that is essentially free of metal values, (h) separating the scandium compound and the aqueous phase, (i) adding a sufficient amount of an alkali metal base to the raffinate to form a solid phase containing the other metal value and, if present, the additional metal values, and a second aqueous phase containing the divalent iron and manganese while maintaining the pH in said raffinate of below about 7.5, (j) separating the second aqueous phase and the solid phase, (k) reacting an aqueous mixture of an alkali metal base and an oxidant with the second aqueous phase at a pH of from about 3 to about 5 to yield a solid containing the iron and a third aqueous phase containing the manganese, (l) separating the solid containing the iron and the third aqueous phase containing said manganese, (m) oxidizing the third aqueous phase containing the manganese at a pH of from about 8 to about 10 in the presence of a base to form solid manganese hydroxide and a fourth aqueous phase that is essentially depleted of metal values, and (n) separating the solid and the fourth aqueous phase.

In accordance with an additional aspect of this invention there is provided a process in accordance with the above described process of this invention where the other metal value is rare earth metal values.

In accordance with another aspect of this invention there is provided a process in accordance with the above-described process of this invention wherein the reducing agent is selected from the group consisting of hydrazine, hydrogen peroxide, hydroxylamine, oxalic acid, sulfur dioxide, hydrochloric acid and formaldehyde.

In accordance with still an additional aspect of this invention there is provided a process in accordance with the above-described process of this invention a process wherein said reducing agent is hydrazine.

In accordance with a further aspect of this invention there is provided a process in accordance with the above-described process of this invention wherein said acid is sulfuric acid having a normality of from about 0.5 to about 1.5 normal.

In accordance with another aspect of this invention there is provided a process in accordance with the above-described process of this invention wherein said chelating agent is selected from the group consisting of carboxylic acids, hydroxy acids, diglycolic acid, ethylenediaminetetraacetic acid and mixtures thereof.

In accordance with still another aspect of this invention there is provided a process in accordance with the above-described process of this invention wherein said waste material contains as additional refractory metals a refractory metal selected from the group consisting of tantalum, niobium and mixtures thereof.

In accordance with additional aspects of this invention there is provided a processes in accordance with the above-described process of this invention wherein iron is recovered as iron oxide, manganese is recovered as manganese oxide and tungsten is recovered as an aqueous solution of sodium tungstate.

DETAILED DESCRIPTION

For a better understanding of the present invention together with other and further objects, advantages and capabilities thereof, reference is made to the following detailed description and appended claims in connection with the above summary.

Our U.S. Pat. No. 4,765,909 issued on Aug 23, 1988 and is assigned to the same assignee as this invention. U.S. Pat. No. 4,765,909 discloses a method for the separation of scandium and via the utilization of a cationic exchange resin followed by selectively eluting the scandium with an acidic solution of a chelating agent. The thorium is then eluted with hydrochloric acid solution. U.S. Pat. No. 4,765,909 is incorporated by reference herein.

Our U.S. Pat No. 4,816,233 issued on Mar. 28, 1989 and is assigned to the same assignee as this invention. U.S. Pat. No. 4,816,233 discloses a method for the recovery of scandium from a tungsten ore residue containing scandium and other metals including manganese and iron. In the process disclosed, the residue is dissolved in an acid solution containing a reducing agent to convert the manganese to the divalent state, an iron reducing agent is added to convert the iron present to the divalent state, the pH is then adjusted to about 1.9 to about 2.1 and the scandium is removed by an iminodiacetic ion exchange resin and is thereafter eluted from the resin with a chelating agent to form an elution solution. The scandium is then precipitated from the elution solution by adding a precipitating agent such as ammonium hydroxide to thereby recover the scandium values. U.S. Pat. No. 4,816,233 is incorporated by reference herein.

This invention addresses the safe disposal of industrial wastes with the simultaneous recovery of valuable strategic metals. Therefore, there is a major challenge to develop a unique and cost-effective technology which turns an industrial waste method into useful products. Such a process is the best solution to the ever increasing problems that industrial wastes impose on the environment. Complete waste utilization is most attractive, economically, technologically and environmentally. It achieves simultaneously three desirable goals: maximal resource utilization and conservation, safe disposal of wastes without the long-term potential liability associated with the landfill disposal, and useful products from wastes. The waste material referred to herein is mainly alkali digestion tailings from a tungsten processing plant but the principles are equally applicable to other waste materials.

In processing of tungsten ores such as wolframites, huebnerites, scheelites, etc., by an alkali digestion operation to solubilize the tungsten values, a waste sludge is generated which contains, in addition to the residual tungsten, many valuable metals. Iron and manganese are the two major components, while scandium and tungsten are the most valuable components even though present in much lower concentrations. Table 1 lists the elemental composition of such a waste sludge as determined by a spark source mass spectrometric method. It indicates that the waste sludge also contains a number of other valuable strategic metals such as, cobalt, nickel, lead, zinc, rare earths, thorium, uranium, chromium, tantalum, niobium, etc. Landfill disposal treats a waste as a useless material whereas as indicated by the data in Table 1 the ore tailings contain substantial metal values and are treated as a viable resource here. The strategy taken in this approach is the disposal of wastes by converting their components into useful products. This invention is addressing a unique technology for waste disposal and utilization.

The industrial waste material of this disclosure can be essentially any material having high metal content of a complex composition. However, the waste material recited herein is mainly the ore tailings from the processing of tungsten ores such as wolframites, huebnerites, scheelite, etc. The tungsten ores are digested in sodium hydroxide to extract the tungsten values resulting in an insoluble residue as a waste sludge. The waste sludge contains two major components, Fe and Mn and many other metals in smaller concentrations. The elemental composition of a typical dried sludge sample, in percent by weight as determined by a spark source mass spectrometric method is shown in Table 1.

TABLE 1

ELEMENTAL COMPOSITION OF THE SLUDGE SAMPLE

| No. | Element | Wt, % | No. | Element | Wt, % |
|-----|---------|-------|-----|---------|-------|
| 1   | Fe      | 22    | 23  | Y       | 0.034 |
| 2   | Mn      | 20    | 24  | Nd      | 0.029 |
| 3   | W       | 4.3   | 25  | La      | 0.027 |
| 4   | Si      | 3.2   | 26  | Mo      | 0.027 |
| 5   | Sn      | 0.96  | 27  | Sc      | 0.021 |
| 6   | Na      | 0.84  | 28  | P       | 0.021 |
| 7   | Ca      | 0.75  | 29  | Sb      | 0.020 |
| 8   | Ti      | 0.40  | 30  | Gd      | 0.020 |
| 9   | Ta      | 0.38  | 31  | Dy      | 0.019 |
| 10  | Nb      | 0.30  | 32  | Er      | 0.014 |
| 11  | Mg      | 0.21  | 33  | V       | 0.012 |
| 12  | Pb      | 0.19  | 34  | Ba      | 0.012 |
| 13  | Ni      | 0.15  | 35  | Yb      | 0.011 |
| 14  | Co      | 0.11  | 36  | Al      | 0.011 |
| 15  | Bi      | 0.10  | 37  | Pr      | 0.0067 |
| 16  | Ce      | 0.082 | 38  | Sr      | 0.0053 |
| 17  | Th      | 0.067 | 39  | Ho      | 0.0042 |
| 18  | Cu      | 0.062 | 40  | Lu      | 0.0042 |
| 19  | K       | 0.0061| 41  | Sm      | 0.0039 |
| 20  | U       | 0.0049| 42  | Tb      | 0.0028 |
| 21  | Zn      | 0.0048| 43  | Rb      | 0.0015 |
| 22  | Cr      | 0.037 |     |         |       |

This invention addresses a unique and cost-effective technology to the disposal of waste materials by converting the valuable metals into useful products. It is the most desirable solution for a waste because it achieves simultaneously the environmental protection and resource conservation. A waste is no more a useless material but a valuable resource. A hydrometallurgical approach is taken for the elimination and utilization of the industrial waste sludge from the consideration of process economics and enviromental impact. Furthermore, the high water content of the sludge material makes a hydrometallurgical treatment very attractive.

The waste sludge is first leached with dilute mineral acid such as sulfuric acid in the presence of an appropriate reductant, such as a reducing agent selected from the group consisting of hydrazine, hydrogen peroxide, hydroxylamine, oxalic acid, sulfur dioxide, hydrochloric acid and formaldehyde, preferably hydrazine, and at ambient temperatures for a sufficient time. The function of the acid-reductant leaching is to dissolve selectively as much of the metal values of Mn, Sc, and other transition metals, but the least amount of Fe into a solution which is separated from the undissolved solid residue. The residue contains the major portion of tungsten and other refractory metals and also the remaining iron. The reductant is needed to achieve a complete leaching of manganese into solution. It also inhibits the leaching of iron values and keeps the iron in the divalent state in the leachate. This is very beneficial because trivalent iron interferes strongly with the scandium recovery by the ion exchange method. A suitable reductant is the one that is capable of reducing the tetra- and/or trivalent Mn and also the trivalent Fe into divalent states in a slightly acidic condition. As an illustration, a mixture of sulfuric acid and hydrazine is used in the sludge leaching. The reason for choosing the sulfuric acid is based on its safety, cost, and effectiveness while hydrazine was selected it is because of its effectiveness and selectivity in reductive leaching of metals. One of the attractive features of this leaching is that the leaching is done effectively in dilute sulfuric acid at ambient temperatures. Selective leaching is achieved by an aqueous acid mixture containing a typical concentration of about 8 parts by volume of hydrazine in about 1000 parts by volume of 0.6N sulfuric acid. The acid is used in amount of about 20 to 25 parts by weight of acid mixture to 1 part by weight of sludge. Occasional stirring increases the speed of leaching. The solid-liquid separation is done easily by any standard method. Filtration under slight vacuum condition is used in this study. The resulting leachate has a pH of about 1 to 2, containing typically about 5 g/l of Fe, about 10 g/l of Mn, and about 0.03 g/l of Sc. Both Fe and Mn exist in the divalent state whereas Sc is in trivalent state. The dissolution of Mn and Sc is virtually quantitative, while half of the Fe is leached and is in divalent state.

It is convenient and practical to recover the most valuable but trace Sc quantitatively in the earliest stage of the process. This is done by passing the leachate through an ion exchange column that is packed with a chelating resin in an amount sufficient to retain scandium completely. The leachate is adjusted to a pH of about 1.8 to about 2.2, preferably 2.0. Occasionally the leachate is contacted with fine iron powders to insure that the iron exists completely as ionic ferrous species in the solution. This is essential to obtain a high purity of scandium product because trivalent iron is also strongly adsorbed. The ion exchange resins used belong to the type of a weakly cation exchange resin with iminodiacetic functional groups. A typical resin used is Amberlite IRC-718 which is manufactured by Rohm & Haas Co. of Philadelphia, Penn. This resin retains almost quantitatively the scandium values in the leachate with a recovery yield of over 90%. The raffinate from the ion exchange column has a typical Sc concentration of about 0.001 g/l (1 ppm) or less. It also contains virtually all the other metals from the leachate. The adsorbed Sc in the resin is essentially completely recovered by eluting the column with an acidic solution of a chelating agent selected from the group consisting of carboxylic acids, hydroxy acids, ethylenediaminetetraacetic acid and mixtures thereof, preferably diglycolic acid, to form a scandium-containing aqueous solution which often contains scandium in concentrations greater than about 0.3 g/l. This is over a ten-fold enrichment from the initial leachate. A solid Sc hydroxide precipitate is obtained by the addition of an alkali solution such as $NH_4OH$ to the scandium-containing solution at a pH range between about 7 and about 9, preferably about 7.5. Upon calcination of the hydroxide precipitate, a white solid containing over about 90% of scandium oxide is obtained. It has a scandium concentration over three thousand times higher than that of the starting sludge.

The Sc-depleted raffinate from the ion exchange operation contains the two major elements, Fe and Mn and other transition and rare metals in lesser amounts. The Fe and Mn exist in their divalent states. The recovery of these other transition and rare metals such as Co, Cr, Y, rare earths, etc., in the presence of large amounts of Fe and Mn is done effectively by a selective precipitation at a pH range between about 6.5 to about 7.5, preferably about 7.2. At higher pH than about 7.5 substantial Fe and Mn are coprecipitated. The recovery and separation of these other metals from the solution are based on the solubility products of metals hydroxides. Divalent Fe and Mn are easily oxidized in air and are precipitated in an alkaline solution having a pH greater than 7.5. As an illustration, about 13 liters of a raffinate solution containing about 2800 ppm of Fe and 9100 ppm of Mn, and other metals is adjusted to a pH of about 7.2 by the addition of about 780 ml of about 1N $NH_4OH$. A metal hydroxide solid is precipitated and separated from the solution. The wet hydroxide has a water content of 80%. About 14% of Fe and 0.6% of Mn from the initial raffinate is coprecipitated. About 24 g of a dried solid is obtained from about 700 g of the initial sludge. A substantial upgrading of these other metals is achieved and makes the precipitate a viable resource for these metals, particularly rare earth metals. The coprecipitation of appreciable amounts of iron is primarily due to the partial oxidation of ferrous to ferric states during the ion exchange and selective precipitation operations. A filtrate of about 14 liters containing about 2220 ppm of Fe and about 8430 ppm of Mn is used for the subsequent recovery of Fe and Mn.

The Fe values from the above filtrate are recovered by an effective and selective operation of oxidative precipitation to yield an easily filterable goethite solid, FeOOH. Fe removal from many industrial streams is often costly and considered as a major technical challenge because of the filtration problem associated with the gelatinous nature of the iron hydroxide precipitates. Fe is removed as a useless waste which needs a safe disposal. However, in this invention, Fe is treated as a valuable component and converted into a saleable product. This is done by adjusting and digesting the solution with an alkali such as $NH_4OH$ and an oxidant such as hydrogen peroxide to a pH between about 3.0 to about 5.0, preferably about 4.5 and at a temperature range between about 70° to about 95° C., preferably about 85° C. for about three hours. The oxidant is used to oxidize the divalent Fe completely to trivalent ferric state which is precipitated quantitatively as easily filterable goethite solid. The iron recovery is quantitative yielding a high purity product.

The Fe-depleted solution contains almost the total Mn values from the sludge. The Mn values can be recovered economically and effectively by an oxidative precipitation operation. This is done by treating the solution with an alkali such as NaOH and an oxidant such as hydrogen peroxide, or air or oxygen, to a pH between about 8 to about 10, preferably about 9.5, at ambient temperatures to yield a solid manganese (III) oxide product. The oxidant is needed to convert the divalent Mn in an alkaline condition to a trivalent Mn hydroxide precipitate. Divalent Mn will be precipitated at a pH greater than about 9.5 to the manganese (II) hydroxide which is quickly oxidized to manganese (III) upon exposure to air. The liquid-solid separation is easy to yield a filtrate which contains virtually no heavy metals and can be discharged directly without further treatment. The Mn recovery is quantitative in a solid product with a purity better than about 99%. The overall recovery process yields only useful metal products from the leachate without generating any hazardous wastes.

The residue from the initial acid leaching operation contains about half of the remaining iron and major portion of tungsten, tantalum and niobium contained in the waste sludge. The iron values are recovered by treating the residue with a concentrated HCl solution at temperatures between about 60° and about 95° C., preferably at about 85° C. to dissolve all the iron to a liquid iron chloride concentrate. This concentrate is a useful product and can be used as a source of iron or in a water/wastewater treatment. The separation of the insoluble material from the liquid concentrate is easy and can be achieved by any standard solid-liquid separation technique. The insoluble material contains the major portion of the tungsten, silicon and other refractory metals such as tantalum and niobium values. The tungsten values can be recovered by digesting the insoluble material with sodium hydroxide solution at temperatures between about 70° to about 95° C., preferably about 85° C. to yield a digested solution which contains mainly W and Si. This liquid W concentrate can be used for the production of tungsten metals or high purity tungsten compounds. The alkali residue from the alkali digestion contains the major portion of tantalum, niobium and titanium and can be used as a useful source of these metals. No additional hazardous wastes are generated from the treatment of the acid residue.

To more fully illustrate the preferred embodiments of this invention, the following detailed example is presented. All parts, percentages and proportions are by weight unless otherwise indicated. This example is not to be viewed as limiting the scope of the invention but is merely illustrative of its preferred embodiments.

EXAMPLE

Five hundred grams of waste sludge are treated with about 10,000 ml of reducing acid that consists essentially of about 75 ml hydrazine in 0.625N sulfuric acid. After overnight digestion at room temperature, the slurry is filtered and there is obtained a residue of about 150 grams and about 90% of filtrate. The filtrate has about the following concentration of metals: 28.8 mg/liter of scandium, 5 g/liter of iron and 8 g/liter of manganese. The ferric iron content of this solution is minimal because it requires less than 1 gram of iron powder to reduce the iron present to the ferrous state as determined by the colorimetric thiocyanate spot test. The pH of the solution is adjusted to a value of 2.0 and the feed solution is passed through an ion exchange column of an iminodiacetic acid resin, sold under the trade name of Amberlite IRC-718 by Rohm and Haas Co., to extract the scandium. This ion exchange resin has an iminodiacetic functionality. The bed volume of the ion exchange column is about 130 $cm^3$ with a cross-section area of about 7.8 $cm^2$. The feed solution is passed through the column at a rate of about 3.6 ml/min. The retention efficiency for scandium is over 95%. The selectivity of this ion exchange resin for scandium in the process is demonstrated by the data in Table 2 which gives the concentration of iron, manganese and scandium in the feed and raffinate solutions.

TABLE 2

| CONCENTRATION OF IRON, MANGANESE AND SCANDIUM | | | |
|---|---|---|---|
| | Fe, ppm | Mn, ppm | Sc, ppm |
| Column feed solution | 4980 | 8000 | 28.8 |
| Column raffinate solution | 4800 | 7800 | 0.88 |

These data indicate that, within the error of the measurement, the concentration of iron and manganese is the same in both the feed and raffinate solutions and, therefore, there is no retention of these divalent metals on the ion exchange column. Furthermore, in spite of the large excess of these metals in the feed solution, the scandium is retained selectively and virtually quantitatively demonstrating the selectivity of the process.

After completion of the extraction step by passing through all the feed solution, the column is washed with about 1200 ml of a dilute solution of sulfuric acid at a pH of about 2.0 to remove remnants of the feed solution. The scandium retaining resin bed is then stripped with 1200 ml of 0.025M diglycolic acid at a flow rate of about 3.6 ml/min. The resin bed is regenerated for another extraction application. The scandium containing solution is treated with an ammonium hydroxide solution to a pH of about 7.5 to precipitate scandium hydroxide. The precipitate is filtered, washed and the filtrate analyzed and contains about 0.7 ppm of scandium.

A combined raffinate solution of about 13,000 ml, containing a concentration of about 2780 ppm of iron, 9100 ppm of manganese and many other metals in much smaller concentrations, is used as a feed solution. The pH of the solution is about 2.3. It is titrated with about 780 ml of 1N $NH_4OH$ to a pH of about 7.2 which results in a creamy greenish slurry. The addition of the alkali solution is done rather quickly (within about 30 minutes) to limit the atmospheric exposure of the slurry because divalent Fe and Mn are easily oxidized in an alkaline solution to the trivalent state which forms the hydroxide precipitate. The slurry is easily filtered by simple vacuum filtration to yield a slightly greenish solid which turns brown upon drying. About 24 grams of dried solid concentrate is obtained. The elemental composition of the dried solid concentrate as determined by spark source mass spectrometric analysis is shown in Table 3. It indicates that the concentrate contains substantial concentration of Cr, Co, Zn, Pb, Y, and rare earths in greater concentrations than those present in the original ore tailings. Substantial concentration upgrading of these metals has been achieved. The effectiveness of the selective precipitation for the recovery of these metals can be further seen from the analysis of the subsequent products of Mn and Fe and the final liquid waste as shown in Tables 4, 5 and 6. Table 3 also indicates that the coprecipitation of Mn is minimal in this precipitation. The filtrate of about 14,000 ml contains about 2220 ppm of iron and about 8430 ppm of manganese. About 86% of Fe and about 99.4% of Mn contained in the original raffinate still remain in the filtrate.

TABLE 3

ELEMENTAL COMPOSITION OF THE METALS CONCENTRATE

| Element | ppm |
|---|---|
| Al | 5,700 |
| Si | 59,000 |
| Ca | 640 |
| Sc | 1,600 |
| Cr | 10,000 |
| Mn | 19,000 |
| Co | 2,500 |
| Ni | 430 |
| Zn | 9,100 |
| Y | 2,000 |
| La | 1,100 |
| Ce | 5,800 |
| Pr | 670 |
| Nd | 2,500 |
| Sm | 420 |
| Eu | 38 |
| Gd | 1,200 |
| Tb | 280 |
| Dy | 1,200 |
| Ho | 220 |
| Er | 860 |
| Tm | 160 |
| Yb | 850 |
| Lu | 370 |
| Pb | 2,300 |

The recovery of iron from above filtrate is done by an oxidative precipitation at a pH range between about 3 and about 5. About 13,000 ml of the filtrate is first treated with about 27 ml of 30% hydrogen peroxide to completely oxidize ferrous iron into ferric state and then titrated at ambient temperature with about 1050 ml of 1N $NH_4OH$ to a final pH of about 4.5. A reddish brown slurry is obtained and filtered to separate the solid from the solution. The solid-liquid separation is done with standard vacuum filtration. This is technically attractive because iron hydroxide precipitates are notorious for their difficulty in filtration because of the gelatinous nature of their colloidal particles. Upon drying the wet precipitate, about 58.32 g of a brown solid is obtained. Table 4 shows the impurity levels of the brown solid which are very low. The iron recovery is almost quantitative as indicated in Table 5 and 6 by the neglible content of iron in the subsequent Mn product and the final waste stream. The resulting filtrate of about 12,400 ml is clear and slightly pink, indicating the presence of Mn and it contains about 68 ppm of Fe and about 8000 ppm of Mn.

TABLE 4

IMPURITIES PRESENT IN IRON (III) OXIDE

| Element | ppm wt |
|---|---|
| Na | 430 |
| Mg | 35 |
| Al | 210 |
| Si | 2900 |
| K | 3.8 |
| Ca | 340 |
| Mn | 3900 |
| Co | 320 |
| Ni | 19 |
| Zn | 1300 |

The recovery of Mn from the solution is done by an oxidative precipitation process at a pH range between about 8 to about 10. 10,300 ml of the above filtrate containing about 68 ppm of Fe and about 8000 ppm of Mn is titrated with about 3760 ml of 1N NaOH to a pH of about 9.5 resulting in a creamy light brown slurry. The slurry is obtained while bubbling air through it. This is done in order to insure complete precipitation of manganese hydroxide by the conversion of the divalent to the trivalent state. The slurry is filtered to yield a black precipitate. About 118 grams of dried precipitate is obtained. Table 5 indicates the impurity content of the black solid of manganese (III) oxide. The recovery of Mn from the filtrate is quantitative. The metals, especially Co, Ni and Zn, that were not completely removed in the first selective precipitation, are recovered. The clear and colorless filtrate has a volume of about 12,000 ml and contains essentially no Fe and Mn. About 500 ml of the filtrate are evaporated to dryness to yield about 17 grams of white solid of sodium sulfate. The impurities present in the waste residue are shown in Table 6. It indicates that the heavy metals are present in the filtrate at very low concentrations, less than about 5 ppm, if present at all. The liquid waste is compatible with current environmental discharge rules.

TABLE 5

IMPURITIES PRESENT IN MANGANESE (III) OXIDE PRODUCT

| Element | ppm wt |
|---|---|
| Na | 2600 |
| Mg | 300 |
| Al | 14 |
| Si | 940 |
| S | 2400 |
| K | 3.1 |
| Ca | 3600 |
| Cr | 7.2 |
| Fe | 2600 |
| Ni | 340 |
| Co | 3600 |
| Zn | 300 |
| Y | 12 |
| La | 89 |
| Ce | 170 |
| Pr | 9.4 |
| Nd | 18 |

TABLE 6

IMPURITIES PRESENT IN THE WASTE RESIDUE

| Element | Solid (ppm) | Filtrate (ppm) |
|---|---|---|
| Li | 1.2 | 0.04 |
| Mg | 580 | 20. |
| Al | 11 | 0.37 |
| Si | 350 | 12 |
| P | 16 | 0.5 |
| Cl | 49 | 1.7 |
| Ca | 1700 | 58 |
| K | 250 | 8.5 |
| Cr | 1.2 | 0.04 |
| Mn | 98 | 3.3 |
| Fe | 44 | 1.5 |
| Br | 35 | 1.2 |

TABLE 7

ELEMENTAL COMPOSITION OF THE ACID AND ALKALI RESIDUES

| Element | Acid residue, % | Alkali residue, % |
|---|---|---|
| W | 26.6 | 0.5 |
| Si | 23.4 | 21.6 |
| Ti | 4.5 | 7.7 |
| Fe | 3.88 | 6.2 |
| Sn | 3.84 | 2.7 |
| Nb | 1.51 | 1.3 |
| Ta | 0.99 | 2.4 |
| Mn | 0.95 | 1.1 |
| Al | 0.93 | 1.5 |
| B | 0.92 | |
| Cl | 0.45 | |
| K | 0.39 | |
| Ca | 0.29 | 0.2 |
| As | 0.27 | |
| P | 0.16 | |
| Zr | 0.12 | 0.2 |
| Cr | 0.07 | |
| Mg | | 0.5 |
| Zn | | 0.3 |
| Y | | 0.2 |
| Th | | 0.2 |
| Nd | | 0.1 |

About 109 grams of the residue from the initial sulfuric acid-hydrazine leaching of the sludge waste is digested with about 400 parts of 6N HCl at about 85° C. for about two hours. The slurry is filtered to yield a dried insoluble acid residue of about 49 grams and a filtrate containing over 70 grams of Fe per liter. The filtrate is a liquid iron chloride concentrate and is a source of Fe. It can be used in water/waste water treatment. The elemental composition of the acid residue is shown in the second column of Table 7. The major components are tungsten, tantalum, niobium, titanium, tin and silicon. The tungsten values are recovered by digesting about 49 grams of this acid residue with about 100 ml of 6N NaOH at about 80° C. for two hours. The slurry is filtered to yield about 34 grams of an alkali residue and a dark brown solution containing a concentration of about 45 gram of tungsten per liter. The elemental composition of the alkali residue is shown in the third column of Table 7. The tungsten content is low in the alkali residue indicating its effective recovery from the acid residue by a simple alkali digestion process. There are no hazardous wastes generated from the treatment of the residues.

While there has been shown and described what are at present considered the preferred embodiments of the invention, it will be obvious to those skilled in the art that various changes and modifications may be made without departing from the scope of the invention as defined by the appended claims.

What is claimed is:

1. A process comprising:
(a) contacting a solid waste material containing metal values that comprise at least tungsten, iron, scandium and manganese and at least one other metal value which metal is selected from the group consisting of Group III metals, cobalt, nickel and rare earth metals and, optionally other refractory metals selected from this group consisting of tantalum and niobium and mixtures thereof and silicon with an acid solution having a normality of about 0.5 to 1.5 containing a reducing agent for conversion of any tetravalent manganese to divalent manganese for a sufficient time at ambient temperature to form a first aqueous acidic leachate containing a major portion of scandium, manganese, divalent iron and a first solid residue containing said tungsten, the remaining iron and if present said other refractory metals,
(b) separating said first aqueous leachate and said first solid residue,
(c) leaching said first solid residue with sufficient hydrochloric acid for a sufficient time to form a second aqueous acidic leachate containing essentially all of said remaining iron as ferric chloride and a second solid residue containing said tungsten and, if present, said other refractory metals,
(d) digesting said second solid residue with an alkali metal base for a sufficient time and at a sufficient temperature to form a first digested solution containing the tungsten and a second solid residue, containing, if present, said other refractory metals,
(e) contacting said first acidic leachate after adjusting the pH to about 1.8 to 2.2 with an iminodiacetic acid cationic ion exchange resin to retain a major portion of said scandium on said resin and forming an aqueous raffinate containing said manganese and divalent iron, and said other metal value,
(f) eluting essentially all of said scandium from said resin by an aqueous solution of a chelating agent to form an aqueous elution solution containing said scandium,
(g) adding a precipitating agent to said elution solution to form a solid scandium compound phase and a first aqueous solution phase that is essentially free of metal values,
(h) separating said scandium compound and said aqueous phase,
(i) adding a sufficient amount of an alkali metal base to said raffinate to form a solid phase containing said other metal value and a second aqueous phase containing said divalent iron and manganese while maintaining the pH in said raffinate of below about 7.5,
(j) separating said second aqueous phase and said solid phase,
(k) reacting an aqueous mixture of an alkali metal base and an oxidant with said second aqueous phase at a pH of from about 3 to about 5 to yield a solid containing said iron in a goethite form and a third aqueous phase containing said manganese,
(l) separating said solid containing said iron and said third aqueous phase containing said manganese,
(m) oxidizing said third aqueous phase containing said manganese at a pH of from about 8 to about 10 in the presence of a base to form solid manganese hydroxide and a fourth aqueous phase that is essentially depleted of metal values, and
(n) separating said solid and said fourth aqueous phase.

2. A process according to claim 1 wherein said reducing agent is selected from the group consisting of hydrazine, hydrogen peroxide, hydroxylamine, oxalic acid, sulfur dioxide, hydrochloric acid and formaldehyde.

3. A process according to claim 2 wherein said reducing agent is hydrazine.

4. A process according to claim 3 wherein said acid is sulfuric acid having a normality of from about 0.5 to about 1.5 normal.

5. A process according to claim 1 wherein said chelating agent is selected from the group consisting of carboxylic acids, hydroxy acids, diglycolic acid, ethylenediaminetetraacetic acid and mixtures thereof.

6. A process according to claim 1 wherein iron is recovered as iron oxide.

7. A process according to claim 1 wherein manganese is recovered as manganese oxide.

8. A process according to claim 1 wherein tungsten is recovered as an aqueous solution of sodium tungstate.

* * * * *